United States Patent
Englert et al.

(10) Patent No.: US 9,217,347 B2
(45) Date of Patent: Dec. 22, 2015

(54) METHOD AND DEVICE FOR TREATING EXHAUST GAS CONDENSATES OF AN INTERNAL COMBUSTION ENGINE

(71) Applicants: Behr GmbH & Co. KG, Stuttgart (DE); MAHLE International GmbH, Stuttgart (DE)

(72) Inventors: Peter Englert, Bad Friedrichshall (DE); Roger Gorges, Birmingham (GB)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 14/308,289

(22) Filed: Jun. 18, 2014

(65) Prior Publication Data

US 2014/0373509 A1    Dec. 25, 2014

(30) Foreign Application Priority Data

Jun. 19, 2013    (DE) .......................... 10 2013 211 509

(51) Int. Cl.

| | |
|---|---|
| *F01N 3/00* | (2006.01) |
| *F01N 3/08* | (2006.01) |
| *F01N 3/20* | (2006.01) |
| *F02M 25/12* | (2006.01) |
| *F01N 3/02* | (2006.01) |

(Continued)

(52) U.S. Cl.
CPC ................ *F01N 3/0892* (2013.01); *F01N 3/02* (2013.01); *F01N 3/2073* (2013.01); *F01N 5/025* (2013.01); *F02M 25/074* (2013.01); *F02M 25/0732* (2013.01); *F02M 25/0751* (2013.01); *F02M 25/12* (2013.01); *F01N 2240/22* (2013.01); *F01N 2240/25* (2013.01); *F01N 2240/34* (2013.01); *F01N 2570/22* (2013.01); *F02M 25/0707* (2013.01); *Y02T 10/16* (2013.01); *Y02T 10/166* (2013.01)

(58) Field of Classification Search
CPC ....... Y02T 10/121; Y02T 10/47; Y02T 10/24; Y02T 10/163; F02B 37/18; F02B 29/04; F02D 25/0707; F02D 25/0737; F02D 25/0731; F02T 10/16
USPC ............. 60/273, 274, 605.1, 605.2, 275, 295; 123/568.15, 568.17, 543, 559.1; 701/108

See application file for complete search history.

(56) References Cited

U.S. PATENT DOCUMENTS

| | | | | |
|---|---|---|---|---|
| 1,905,627 | A | * | 4/1933 | Holland ......................... 204/278 |
| 2,140,254 | A | * | 12/1938 | Zavka ............................ 123/545 |
| 4,480,595 | A | * | 11/1984 | Hobby et al. .................. 123/1 A |

(Continued)

FOREIGN PATENT DOCUMENTS

| | | |
|---|---|---|
| DE | 198 02 520 C1 | 3/1999 |
| DE | 10 2008 049 625 A1 | 4/2010 |

(Continued)

OTHER PUBLICATIONS

FR 2941499, Machine Translated on Mar. 25, 2015.*

*Primary Examiner* — Patrick Maines
(74) *Attorney, Agent, or Firm* — Muncy, Geissler, Olds & Lowe, P.C.

(57) ABSTRACT

A method for treating exhaust gas condensates of an internal combustion engine, in which the exhaust gas condensates containing nitrogen oxides are delivered to an exhaust gas recirculation system and are cooled therein. The nitrogen oxides of the cooled exhaust gas condensates are converted to ammonia through electrolysis.

10 Claims, 1 Drawing Sheet

(51) Int. Cl.
*F01N 5/02* (2006.01)
*F02M 25/07* (2006.01)

(56) References Cited

U.S. PATENT DOCUMENTS

| | | | |
|---|---|---|---|
| 6,547,947 B1* | 4/2003 | Uno et al. | 205/466 |
| 8,272,371 B2 | 9/2012 | Fasold et al. | |
| 2003/0085135 A1* | 5/2003 | Andrews et al. | 205/637 |
| 2008/0241033 A1* | 10/2008 | Nazri | 423/237 |
| 2010/0018476 A1* | 1/2010 | Zemskova et al. | 123/3 |
| 2010/0242928 A1* | 9/2010 | Fasold et al. | 123/568.12 |
| 2011/0259290 A1* | 10/2011 | Michikawauchi et al. | 123/1 A |
| 2011/0283960 A1* | 11/2011 | Hikazudani et al. | 123/3 |
| 2011/0302909 A1* | 12/2011 | Botte | 60/274 |
| 2011/0311421 A1* | 12/2011 | Backhaus-Ricoult et al. | 423/213.2 |
| 2012/0240557 A1* | 9/2012 | Kawaguchi et al. | 60/278 |
| 2014/0020365 A1* | 1/2014 | Ostuni et al. | 60/274 |

FOREIGN PATENT DOCUMENTS

| | | | |
|---|---|---|---|
| FR | 2 941 499 A1 | 7/2010 | |
| FR | 2941499 A1 * | 7/2010 | F02M 25/07 |
| WO | WO 2010/075205 A2 | 7/2010 | |

* cited by examiner

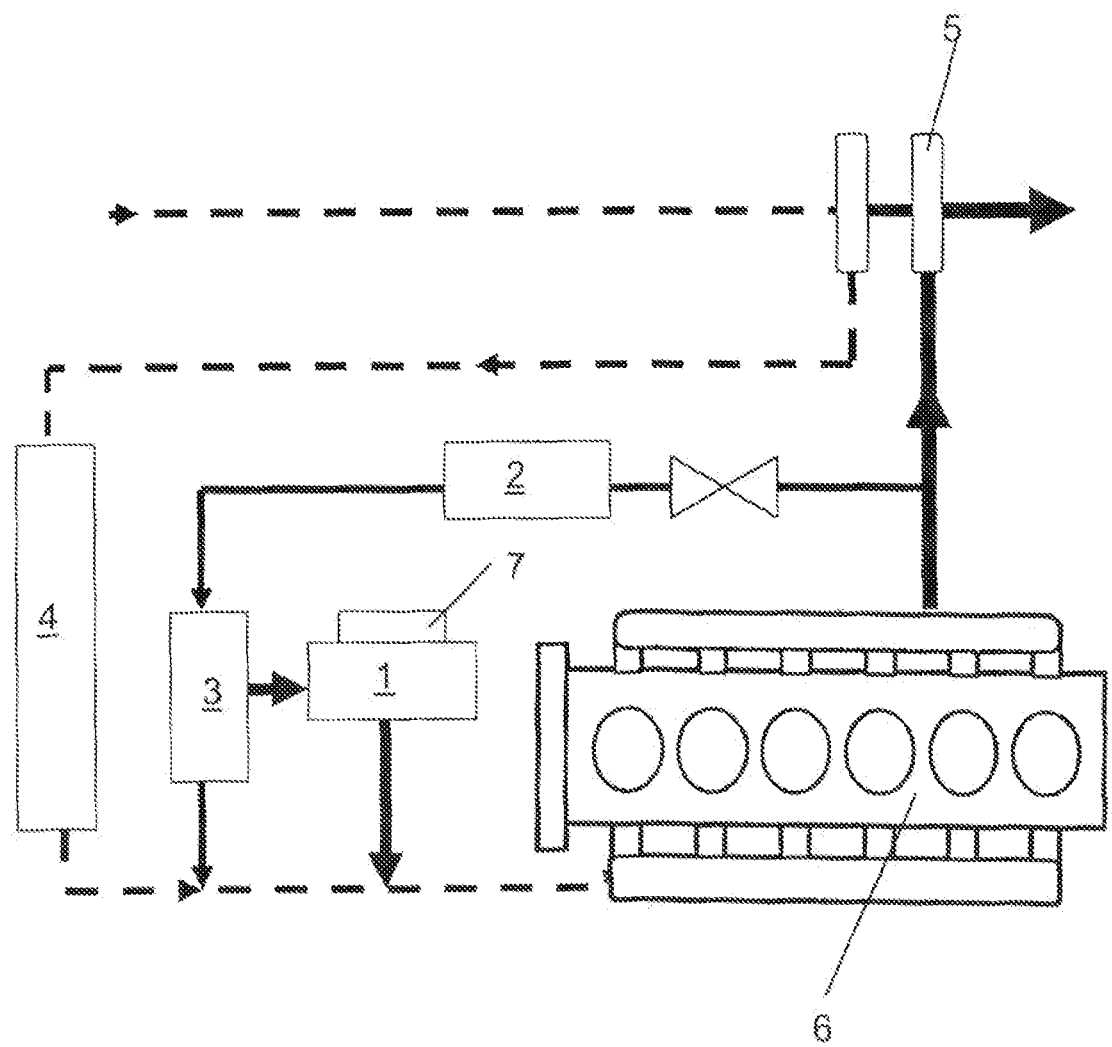

METHOD AND DEVICE FOR TREATING EXHAUST GAS CONDENSATES OF AN INTERNAL COMBUSTION ENGINE

This nonprovisional application claims priority under 35 U.S.C. §119(a) to German Patent Application No. 10 2013 211 509.1, which was filed in Germany on Jun. 19, 2013 and which is herein incorporated by reference.

BACKGROUND OF THE INVENTION

1. Field of the Invention

The invention relates to a method for treating exhaust gas condensates of an internal combustion engine and a device for treating exhaust gas condensates of an internal combustion engine.

2. Description of the Background Art

Exhaust gas recirculation systems in motor vehicles are known that are combined with the internal combustion engine of the motor vehicle. Exhaust gas recirculation systems of this nature represent an essential strategy for reducing pollutant emissions, especially nitrogen oxide ($NO_x$) emissions. Prior to its reinjection into the internal combustion engine, the exhaust gas returned to the internal combustion engine is cooled below the dew point of water to as low as 40° C. by an exhaust gas cooler contained in the exhaust gas recirculation system. During this cooling process, great quantities of aqueous condensate are produced as a consequence of the combustion of fuels in the engine. Exhaust gas pollutants, such as, e.g., nitrogen oxides, sulfur oxides, and organic substances, dissolve in the exhaust gas condensates that accumulate, and consequently inorganic and organic acids are formed. These acidic condensates represent a significant problem, since they corrode the materials of the exhaust gas cooler as well as downstream components of the internal combustion engine.

A method and a device for neutralizing acidic condensate in a motor vehicle are known from DE 10 2008 049 625 A1, which corresponds to U.S. Pat. No. 8,272,371, wherein the exhaust gas recirculation system has an exhaust gas recirculation cooler for cooling the hot exhaust gas stream. A metering system for the metered addition of an alkaline substance to the hot exhaust gas stream is arranged upstream of the exhaust gas recirculation cooler. The acidic condensate in the internal combustion engine is neutralized by this alkaline substance.

SUMMARY OF THE INVENTION

It is therefore an object of the invention to provide a method and a device that permit energetically favorable neutralization of exhaust gas condensates.

In an embodiment, this is achieved whereby nitrogen oxides of the cooled exhaust gas condensates are converted to ammonia through electrolysis. The conversion of the nitrogen oxides into ammonia results in a reduction of the nitrogen oxides in the exhaust gas condensate that is fed back to the internal combustion engine. In the process of electrolysis, hydroxyl ions that contribute to the neutralization of the nitrogen oxides are obtained from the exhaust gas condensate. By means of such electrochemical reduction, exhaust gas purification can advantageously proceed after the cooling of the exhaust gas condensates.

In an embodiment, the electrolysis takes place in the region of a dew point of water, preferably above the dew point. In this way, the production of acidic exhaust gas components during electrolysis is suppressed, thus avoiding corrosion of the materials of the exhaust gas cooler as well as downstream components of the internal combustion engine.

In an embodiment, energy for the electrolysis is obtained from waste heat of the internal combustion engine. In this process, the waste heat is not only used to electrolytically produce ammonia from nitrogen oxides, but also to electrolytically produce hydrogen for $CO_2$ reduction and to electrolytically produce hydroxyl ions in the condensate.

In an embodiment, the energy is obtained from the waste heat of the internal combustion engine by means of a thermoelectric process. Such a form of energy is especially suitable for the electrolysis process.

In addition, the ammonia produced during the electrolysis can be used in an SCR exhaust gas purification method in the internal combustion engine. In this process, a comproportionation reaction is initiated, which should be understood hereinafter to mean a special case of a redox reaction in which the simultaneous reduction and oxidation of two atoms of the same element from a higher and a lower oxidation state form an intermediate oxidation state. Such a comproportionation reaction advantageously takes place when the reduced condensate mixture in the form of water vapor containing ammonium and hydrogen is fed back into the combustion process of the internal combustion engine. A reduction in the formation of nitrogen oxides occurs here due to the comproportionation reaction of the nitrogen oxides with ammonia to form nitrogen during the combustion process.

In another embodiment, the hydrogen produced during the electrolysis can be added to charge air prior to delivery to the internal combustion engine. Such hydrogen enrichment entails a reduction in $CO_2$ emissions.

A further development of the invention provides a device for treating exhaust gas condensates of an internal combustion engine, in which an exhaust gas containing exhaust gas condensates and emerging from the internal combustion engine is delivered either directly or through a turbocharger to at least one exhaust gas cooler that is connected to the internal combustion engine for recirculation of the exhaust gas. In a device in which the exhaust gas condensates are reduced, an electrolysis unit for converting nitrogen oxides into ammonia is arranged between the exhaust gas cooler and the internal combustion engine. Optimization of the exhaust gas condensate contained in the cooled exhaust gas that is fed back to the internal combustion engine is accomplished by such an electrolysis unit. This applies in particular to the electrolytic ammonia production from the nitrogen oxides occurring as exhaust gas condensate. At the same time, however, hydrogen is also produced during the electrolysis, by means of which a $CO_2$ reduction in the exhaust gas can also be achieved.

In an embodiment, the electrolysis unit can be combined with a thermoelectric generator in order to provide electric power. This thermoelectric generator utilizes the waste heat of the internal combustion engine to provide energy for the electrolysis. Consequently, the waste heat serves as an energy source for the electrochemical reduction process.

In an embodiment, the internal combustion engine includes a catalytic converter utilizing an SCR exhaust gas purification method to which the ammonia produced during the electrolysis is delivered. This has the advantage that the additional provision of urea solutions in containers in order to produce ammonia, as is necessary in prior art SCR methods, is dispensed with, with the result that the installation space for the internal combustion engine can be reduced further.

In an embodiment, an intake of an intercooler providing fresh air is connected to an outlet of the electrolysis unit upstream of an intake of the internal combustion engine. This has the advantage that the hydrogen provided in the electrolysis unit can react with the oxygen of the fresh air, thus resulting in a reduction of the $CO_2$ emissions by enriching the mixture with hydrogen in the charge air.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus, are not limitive of the present invention, and wherein the sole FIGURE illustrates an exemplary embodiment of a device according to the invention for treating exhaust gas condensates of an internal combustion engine.

DETAILED DESCRIPTION

The FIGURE shows an exemplary embodiment of a device according to the invention for treating exhaust gas condensates of an internal combustion engine 6. This exemplary embodiment involves high-pressure exhaust gas recirculation, in which one portion of the exhaust gas containing the exhaust gas condensates is routed directly from the internal combustion engine 6 to the exhaust gas recirculation system. The other portion of the hot exhaust gas is directed from the internal combustion engine 6 to a turbocharger 5.

The exhaust gas recirculation system has a first exhaust gas cooler 2, with a second exhaust gas cooler 3 located downstream thereof. The exhaust gas routed through the first and second exhaust gas coolers 2, 3 is thus cooled, and then mixed with the fresh air emerging from the air-cooled intercooler 4.

The second exhaust gas cooler 3 has a branch through which the main part of the cooled exhaust gas is delivered to an electrochemical cell 1. The electrochemical cell 1 is combined with a thermoelectric generator 7. The exhaust gas purified by the electrochemical cell 1 is mixed with the fresh air stream emitted by the intercooler 4, with this mixture in turn being delivered to the internal combustion engine 6.

In the electrochemical cell 1, which is implemented as a flow-through electrolysis cell, electrochemical denitrification is carried out during electrolysis. In this process the nitrogen oxides, such as nitrates and nitrites, contained in the exhaust gas condensates are converted into elementary nitrogen. During this electrolysis, ammonia and hydrogen form as reaction products. The ammonia has the advantage that it neutralizes the acidic exhaust gas condensates, so that corrosive constituents are eliminated from the exhaust gas condensates. If the condensate mixture is now delivered to the internal combustion engine 6 in the form of water vapor containing ammonia and hydrogen, a reduction in the formation of nitrogen oxides occurs here due to a comproportionation reaction of the nitrogen oxides with ammonia to form nitrogen during the combustion process. This reaction can take place in a catalytic converter at decreased activation energy, which is to say reduced exhaust gas temperature, or else can take place directly in the combustion process at the higher temperature that prevails there.

The SCR exhaust gas purification method is implemented in the internal combustion engine. SCR (Selective Catalytic Reaction) refers to a selective catalytic reaction of nitrogen oxides in engine exhaust gases. This chemical reaction is selective because not all components of the exhaust gas are reduced, but rather only the nitrogen oxides NO, $NO_2$. Because of the ammonia that the electrolysis makes available, there is no need for separate provision of a urea solution in order to produce ammonia. Consequently, the SCR method can be implemented in the internal combustion engine 6 without added auxiliary materials.

In the side reaction of electrolysis in the electrochemical cell 1, hydrogen is produced electrolytically, which in turn contributes to a reduction in $CO_2$ output, since a portion of the combustion energy comes from the combustion of hydrogen.

As already explained, the electrochemical cell 1 is combined with a thermoelectric generator 7. Large currents are produced at low voltages (2 to 8 volts) by means of the thermoelectric generator 7. The thermoelectric process makes use of the Seebeck effect, which is known per se, in which the occurrence of a voltage between two points with different temperatures on a conductor is exploited. The potential difference here is approximately proportional to the temperature difference, and depends on the conductor material. The flow of heat through the conductor with different temperatures produces an electrical voltage in this context. Alternatively, the use of other generators driven by waste heat to produce the electrolysis current is also possible.

For example, if 200 kW of waste heat of an internal combustion engine 6 are converted into electrical energy with an efficiency of 5%, 10 kW of electric power are available for electrolysis in the electrochemical cell 1. For electrolysis with 5 volts cell voltage, a current of 2000 amperes results. For an efficiency of the electrochemical cell 1 of 70%, 1400 amperes of current remain available for electrolysis. If one considers an emission of 300 mg $NO_x$ per kilometer driven, as is required for an ordinary diesel passenger car by the Euro 4 Standard, and full exhaust gas recirculation, then the result for a speed of 100 km/h is 30 g nitrogen oxides that must be electrolytically converted per hour.

Calculated with the Faraday equation i.

$$m = \frac{M * Q}{z * F} \qquad (1)$$

where
Q=charge (ampere-seconds)
M=molar mass of the nitrogen oxide NO 30.0 g/mol
m=mass of nitrogen oxide 30 g/h
z=electron number 5
F=Faraday constant 95485 As/mol,
the result is a charge Q=485425 As/3600 s=134 A/h.

For a cell voltage of 5 volts, 670 watt-hours=0.67 kWh are required to reduce such a quantity of nitrogen oxides.

Thus, a minimum of 0.67 kW/h power is required. When efficiency losses are added in, this conversion can be achieved with approximately 1 kWh power for producing the electrolysis current. Previously known thermoelectric generators with dimensions of 50×50 mm deliver power of 20 watts, for example. Thus, heat exchanger areas less than 1 $m^2$ are required for a power of 1000 watts with ordinary commercial thermoelectric generators.

For a conversion of 25 kW waste heat into electrolysis current using the proposed method, which corresponds to approximately 10% efficiency from 250 kW waste heat from the internal combustion engine, 3.9 kg of nitrogen oxides can be converted according to the calculation performed using equation (1).

The reduction of nitric acid will be presented as an example. The current I=P/V=2500 W/3V corresponds to 8333 amperes, where P represents power and V represents voltage. According to equation 1, this results in a mass m of the nitrogen oxide.

$$M=63 \text{ g/mol}*8333 \text{ amperes (C/s)}*3600 \text{ s}/5*9485 \text{ C/mol}=3917 \text{ g.}$$

The efficiency of the Seebeck effect depends primarily on the temperature difference of the two electrodes of the conductor employed. The thermal separation can be improved significantly through active removal of the thermal flows. This can be accomplished either by means of fluids or by means of solids such as boron nitrite.

The described approach has the advantage that the energetically favorable comproportionation reaction of the nitrogen oxides with ammonia to form nitrogen takes place directly in the combustion process. At the same time, the waste heat of the internal combustion engine is used to purify the exhaust gases, with no mechanical conversion losses arising in the utilization of the waste heat.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for treating exhaust gas condensates of an internal combustion engine, the method comprising:
   delivering the exhaust gas condensates containing nitrogen oxides to an exhaust gas recirculation system;
   cooling the exhaust gas condensates in the exhaust gas recirculation system;
   converting the nitrogen oxides of the cooled exhaust gas condensates to ammonia through electrolysis via an electrolysis unit, and
   mixing the ammonia with fresh air provided from an outlet of an intercooler connected to an outlet of the electrolysis unit at a position upstream of an intake of the internal combustion engine.

2. The method according to claim 1, wherein the electrolysis takes place above a dew point of water.

3. The method according to claim 1, wherein energy for the electrolysis is obtained from waste heat of the internal combustion engine.

4. The method according to claim 3, wherein the energy for the electrolysis is obtained from the waste heat of the internal combustion engine via a thermoelectric process.

5. The method according to claim 1, wherein ammonia produced during the electrolysis is used in SCR exhaust gas purification in the internal combustion engine.

6. The method according to claim 1, wherein hydrogen produced during the electrolysis is added to charge air prior to delivery to the internal combustion engine.

7. A device for treating exhaust gas condensates of an internal combustion engine, the device comprising:
   at least one exhaust gas cooler connected to the internal combustion engine, wherein an exhaust gas containing exhaust gas condensates and emerging from the internal combustion engine is delivered either directly or through a turbocharger to the at least one exhaust gas cooler for recirculation of the exhaust gas; and
   an electrolysis unit that converts, via electrolysis, nitrogen oxides into ammonia, the electrolysis unit being arranged between the exhaust gas cooler and the internal combustion engine,
   wherein an outlet of an intercooler providing fresh air is connected to an outlet of the electrolysis unit upstream of an intake of the internal combustion engine.

8. The device according to claim 7, wherein the electrolysis unit is combined with a thermoelectric generator to provide electric power.

9. The device according to claim 7, wherein the internal combustion engine includes a catalytic converter utilizing SCR exhaust gas purification to which the ammonia produced during the electrolysis is delivered.

10. The device according to claim 7, wherein the electrolysis unit is an electrochemical cell.

* * * * *